United States Patent [19]
Morton

[11] Patent Number: 5,867,322
[45] Date of Patent: Feb. 2, 1999

[54] REMOTE APPROVAL OF LENTICULAR IMAGES

[75] Inventor: Roger R. Morton, Penfield, N.Y.

[73] Assignee: Eastman Kodak Company, Rochester, N.Y.

[21] Appl. No.: 909,789

[22] Filed: Aug. 12, 1997

[51] Int. Cl.⁶ .......................... G02B 27/10; G02B 27/22; G03B 27/32; G03B 35/00
[52] U.S. Cl. .......................... 359/619; 359/463; 355/77; 396/327; 396/330
[58] Field of Search .................... 359/619, 462, 359/463; 355/22, 77; 396/324, 327, 330

[56] References Cited

U.S. PATENT DOCUMENTS

| | | | |
|---|---|---|---|
| 2,652,326 | 9/1953 | Ogle | 95/2 |
| 3,028,785 | 4/1962 | Leach | 88/24 |
| 3,895,867 | 7/1975 | Lo et al. | 95/18 |
| 4,963,959 | 10/1990 | Drewlo | 358/88 |
| 5,276,478 | 1/1994 | Morton | 355/22 |
| 5,278,608 | 1/1994 | Taylor et al. | 355/22 |
| 5,424,553 | 6/1995 | Morton | 250/548 |
| 5,475,419 | 12/1995 | Carbery | 348/59 |
| 5,477,353 | 12/1995 | Yamasaki | 358/487 |
| 5,479,270 | 12/1995 | Taylor | 358/488 |
| 5,546,120 | 8/1996 | Miller et al. | 348/59 |
| 5,712,732 | 1/1998 | Street | 359/630 |
| 5,731,883 | 3/1998 | Morton et al. | 358/451 |
| 5,786,902 | 7/1998 | Morton | 358/475 |

*Primary Examiner*—Georgia Epps
*Assistant Examiner*—Ricky Mack
*Attorney, Agent, or Firm*—Gordon M. Stewart

[57] ABSTRACT

A method for remote approval of lenticular images and an apparatus which can execute the method. In the method, a centralized hub station receives a series of images. A user then views at a terminal remote from the centralized hub station, a simulated lenticular image using at least some images of the series displayed to simulate viewing an actual lenticular image formed from the images of the series. Following such viewing, an approval is transmitted from the remote terminal to the centralized hub station, for a plurality of the images of the series to be printed as the actual lenticular image. The actual lenticular image is then printed at the hub station based on the approval.

24 Claims, 9 Drawing Sheets

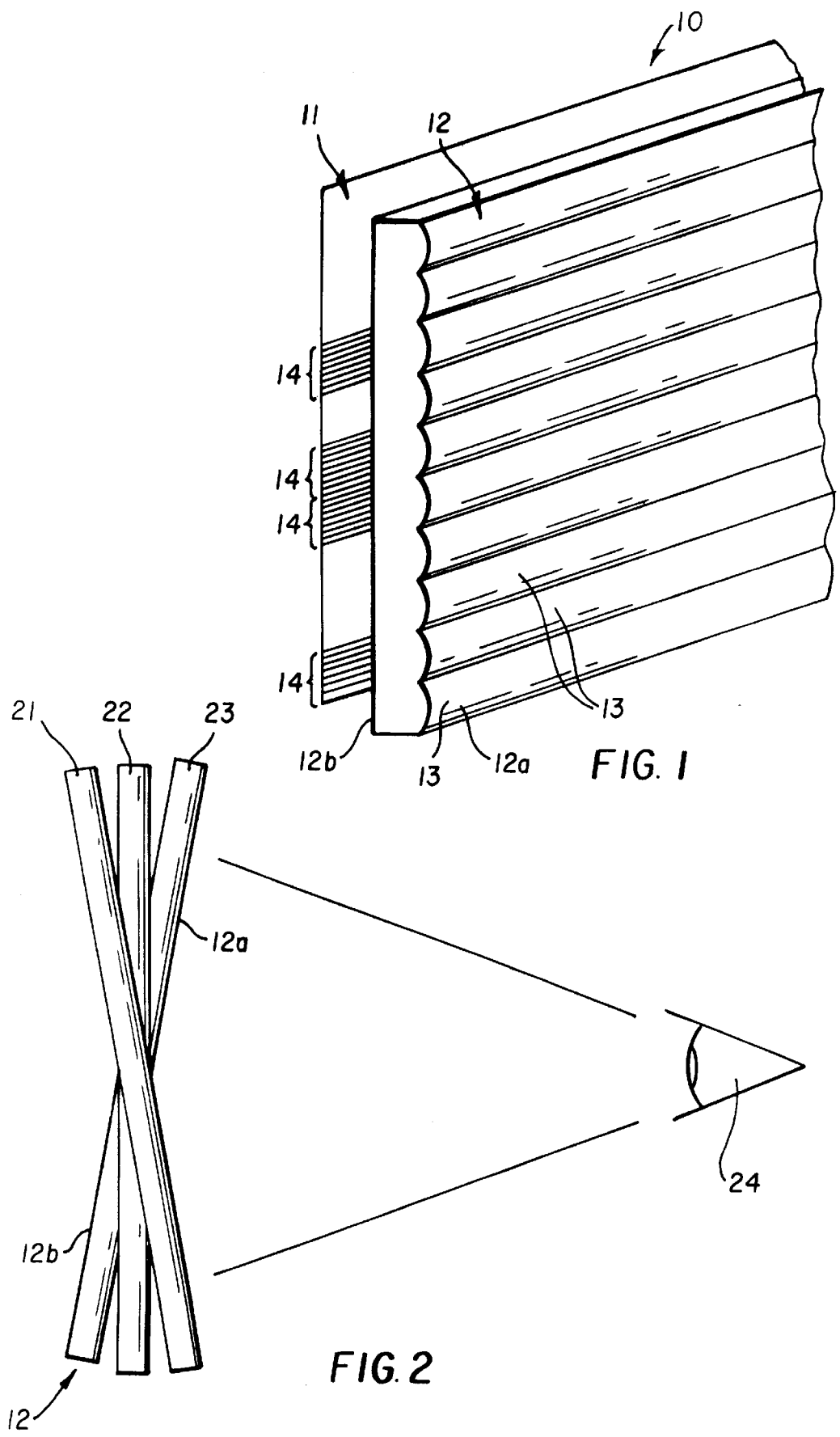

5,867,322

REMOTE APPROVAL OF LENTICULAR IMAGES

FIELD OF THE INVENTION

This invention relates to the field of integral imaging, and lenticular imaging in particular.

BACKGROUND OF THE INVENTION

Integral image elements which use a lenticular lens sheet or a fly's eye lens sheet, and a three-dimensional integral image aligned with the sheet, so that a user can view the three-dimensional image without any special glasses or other equipment, are known. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are also described in the following United States patents: U.S. Pat. No. 5,391,254; U.S. Pat No. 5,424,533; U.S. 5,241,608; U.S. Pat. No. 5,455,689;U.S. Pat No. 5,276,478; U.S. Pat No. 5,391,254; U.S. Pat No. 424,533 and others; as well as allowed U.S. Patent application Ser. No. 07/931,734. Use of barrier viewing sheets having alternating opaque and transparent lines, instead of a lenticular lens sheet, is also well known.

Integral image elements with lenticular lens sheets use interlaced vertical image slices which, in the case of a three-dimensional integral image, are aligned with the lenticules so that a three-dimensional image is viewable when the lenticules are vertically oriented with respect to a viewer's eyes. Similar integral image elements, such as described in U.S. Pat No. 3,268,238 and U.S. Pat No. 3,538,632, can be used to convey a number of individual two-dimensional scenes (such as unrelated scenes or a sequence of scenes depicting motion) rather than one or more three-dimensional images. Such elements then, when tilted through a range of angles with respect to a viewer's eyes (by moving the element and/or the viewer's eyes), can display different images (whether different perspectives of the same scene) and/or unrelated images, and/or a sequence of images depicting a motion sequence of events. Alternatively, a lenticular image and lens can be slid (either manually or my a motorized arrangement) with respect to one another in a direction orthogonal to the lenticule direction. This can provide for convenient display of a motion or other lenticular image, without changing the angle between the viewer and the lenticular image element. With improvements in technology, the effects obtained can be startling.

Integral image elements using reflective layers behind the integral image to enhance viewing of the integral image by reflected light, are also described in U.S. Pat. No. 3,751,258, U.S. Pat. No. 2,500,511, U.S. Pat. No. 2,039,648, U.S. Pat. No. 1,918,705 and GB 492,186.

In a typical method of assembling a lenticular type of integral image element, an original negative is exposed from stored digitized data of a composite lenticular image on a film writer. A suitable film writer is the Symbolic Sciences International Fire 1000 and the LVT Model 1620B, available from Light Valve Technology, a subsidiary of Eastman Kodak Company, Rochester, N.Y. A suitable negative exposure technique is disclosed in U.S. Pat. No. 5,276,478. After photographic processing, the negative is printed, typically by a projection enlarger, onto a suitable film- or paper-based photographic print stock. After processing, the lenticular composite print is coated with adhesive, aligned with a lenticular lens sheet, and pressed against the lens sheet to permanently adhere to it in proper registration with the printed lenticular composite image. However, it is also known to write the lenticular image directly onto a back side of a lenticular lens sheet which is coated with a suitable receiving layer, such as disclosed in U.S. Pat. No. 5,349,419 and U.S. Pat. No. 5,279,912. Furthermore, such "writing" of the lenticular image can be temporary, as in a display produced on a CRT or Liquid Crystal Display ("LCD") screen immediately adjacent the back side.

In forming a lenticular image, the various images from which a lenticular image is formed are decomposed into strips or lines (which may be one or more pixels in width) and these are interleaved and aligned behind a corresponding lenticule at its focal point, in a known manner. Such interleaving is, for example, described in U.S. Pat. No. 4,506,296, U.S. Pat. No. 5,278,608, U.S. Pat. No. 5,276,478, U.S. Pat. No. 5,455,689, and U.S. Pat. No. 3,534,164. This process is computationally intensive and requires considerable time for lenticular images of high resolution. Furthermore, since different lenticular lens sheets have different physical parameters, such as lenticular pitch, the required calculations can change for a lenticular image of given content for different lenticular lens sheets.

Often however, in the preparation of a desired lenticular image, the customer for the final lenticular image is remote from a lenticular image production facility which has lenticular lens sheets of different parameters, the required high computer power, and the necessary high resolution printers, and also alignment devices (which may or may not be part of the printer). Further, creative personnel may be present at such sites to aid in subjective judgements as to variations in lenticular image characteristics in order to obtain a final lenticular element of good quality. However, in most cases a customer's approval is necessary before the job can proceed to its next step. Conventionally, this required actually producing a rough lenticular image element based on oral discussions with the customer. This would then be delivered to the customer for review. Based on customer input, one or more such rough lenticular image elements might be required. Such a procedure is exceedingly costly, time consuming, and tedious.

It would be desirable then, to provide a means by which lenticular image elements can be created at a central facility, but which still allow a remote customer to provide approval prior to production of the final lenticular image, without having go through the foregoing tedious procedure.

SUMMARY OF THE INVENTION

The present invention recognizes that remote approval of a lenticular image can be obtained using a communication system between a computer at a central integral image manufacturing facility and a remote terminal. The present invention further realizes that integral images, unlike ordinary images, cannot actually be viewed on a conventional two-dimensional computer display. That is, a conventional two-dimensional display cannot display integral images in the manner they appear through an actual integral lens sheet. Furthermore, the present invention also realizes that transferring the large amounts of data representing the many conventional images from which an integral image is formed, is not desirable due to current bandwidth problems on many lower cost communications networks (such as a telephone network).

The present invention provides then, in one aspect, a method for remote approval of lenticular images, comprising:

a) at a centralized hub station, receiving a series of images;

b) viewing, at a terminal remote from the centralized hub station, a simulated lenticular image using at least some images of the series displayed to simulate viewing an actual lenticular image formed from the images of the series;

c) transmitting an approval from the remote terminal to the centralized hub station, for a plurality of the images of the series to be printed as the actual lenticular image;

d) at the hub station, printing the actual lenticular image based on the approval.

In another second aspect, the present invention provides a method for remote approval of lenticular images between a centralized hub station and a terminal remote from the hub, comprising:

a) viewing, at the remote terminal, a simulated lenticular image using a series of images displayed to simulate viewing an actual lenticular image formed from images of the series, which simulated image is based on at least one physical parameter of a lenticular lens sheet;

b) transmitting the at least one lens sheet parameter between the hub station and remote terminal;

c) transmitting an approval of the actual lenticular image from the remote terminal to the hub station; and d) at the hub station, printing the actual lenticular image and aligning it with a lenticular lens sheet having the at least one lens sheet parameter.

The present invention further provides an apparatus for printing lenticular images with remote approval, comprising:

a) a centralized hub station having:

a first communication means for allowing the centralized hub station to communicate with a terminal remote from the hub station;

a printer to print a lenticular image based on an approval communicated from a remote hub station;

b) a terminal remote from the hub station having:

a display means for viewing a simulated lenticular image which uses a plurality of images displayed to simulate viewing an actual lenticular image formed from images of a series;

second communication means for communicating with the centralized hub station, including transmitting an approval for a plurality of the image series to be printed as a lenticular image.

The invention of the present invention allows an individual remote from a central site which may make the lenticular image, to obtain a relatively realistic representation of the appearance of a desired actual lenticular image prior to printing the image at the central site, using readily available computer equipment. The invention further allows the necessary approval for the actual lenticular image to therefore be obtained without need for manufacturing one or more rough lenticular image elements. Further, the invention can allow for a reduced data volume transmitted between the central location and the remote terminal, versus that required for transmitting all of the images which form the desired actual lenticular image.

BRIEF DESCRIPTION OF THE DRAWINGS

FIG. 1 is a perspective view of a typical lenticular image element;

FIG. 2 is a side view illustrating tilting of a lenticular motion image element to view the images of the motion sequence;

To facilitate understanding, identical reference numerals have been used, where possible, to designate identical elements that are common to the figures.

DETAILED DESCRIPTION OF THE INVENTION

Figure 3:
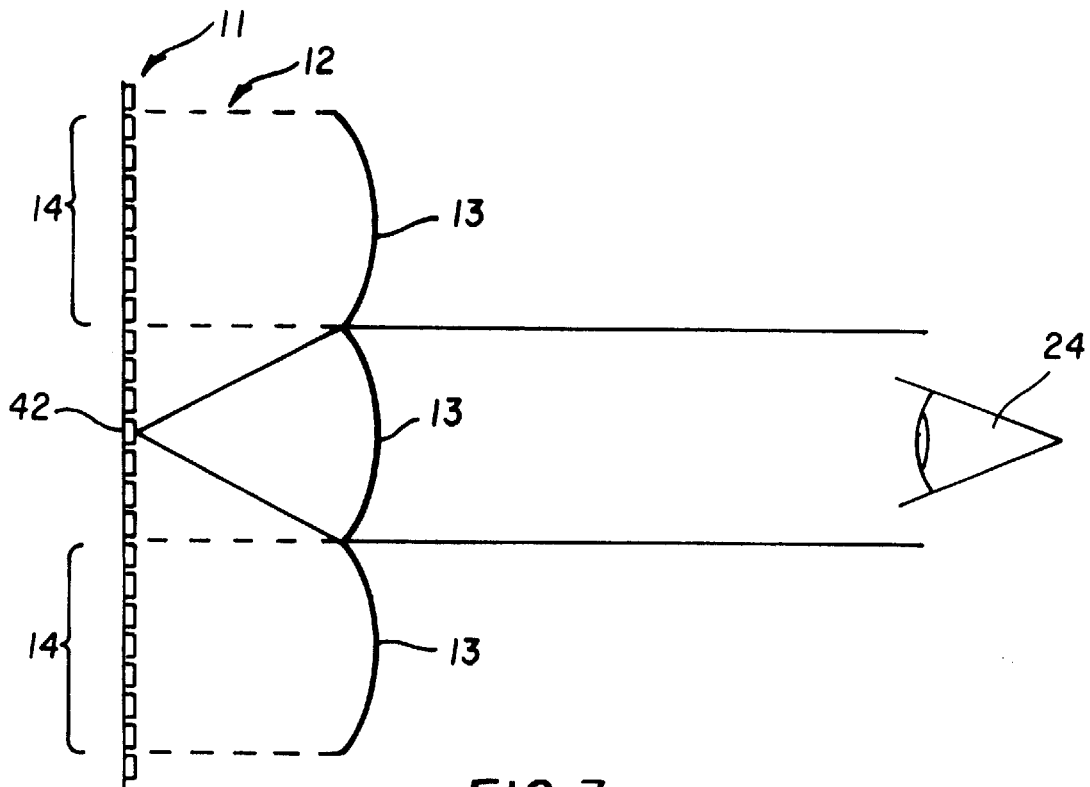
FIGS. 3–5, are enlarged side views illustrating in detail what a viewer sees through each lenticule during the tilting motion of FIG. 2.

In the present invention, it will be understood that a "set" of images includes one or more images. The images may be of any type, and include any number or all of the images being images of real world scenes or computer generated images generated from still image sequences, depth image sequences, or motion sequences in either film or electronic or other image source. An "image" when used alone, is used to reference a conventional two-dimensional image such as might be observed by the unaided eye on a conventional photograph or printed page, unless the contrary is indicated. While the integral lens sheet used in the present invention could be a fly's eye lens sheet it is more preferably a lenticular lens sheet with lenticules on a front surface, in which case the corresponding image used with the sheet is a lenticular image. Alternatively, the integral lens sheet could have regions of varying indices of refraction through its volume configured in such a way as to provide (in conjunction with the surfaces of the sheet, such as a curved external surface, flat external surface or some other shape) the same optical deflection of light rays as would be provided by a conventional fly's eye or lenticular lens sheet. Also, the back surface of the lens sheet may also be curved so as to either strengthen the lens effect or compensate for the curved focal plane which may be inherent in the lens construction. Consequently, the curvature on the back side may be of such a shape as to match the curvature of the focal plane of the lens. Further, by an "integral" image is referenced an image composed of segments (interleaved lines, in the case of a lenticular image) from at least one complete image (and typically more than one image), which segments are aligned with respective individual lenses so that each of the one or more images is viewable when a user's eyes are at the correct angle relative to the imaging element. An integral lens web may be a continuous web of any integral element lens sheet. A lenticular lens sheet in aspect of the present invention, can be readily replaced with a barrier sheet which is formed of a plurality of elongated, parallel, slits, in a known manner for use with the lenticular images. However, since barrier sheets block much of the light from the lenticular image, viewed image brightness will typically be less than when an equivalent lenticular lens sheet is used.

It will be appreciated throughout this application, by a "processor" is referenced a suitable signal processor, such as a suitably programmed general purpose digital processor or hard wired equivalent circuitry, or any combination of the two. A "memory" can be any suitable signal storage device, such as a magnetic or optical disk drive or tape, or a solid state memory. As to transmitting or communicating images, this references sending image signals corresponding to images, from one location to another. Thus, reference to images that are to be transmitted implies, unless otherwise indicated, that image signals are being referenced. By "remote" in the present case, is referenced that the two locations of interest are preferably in a different building, or they may be separated by 1 or more, 5 or more, 100 or more, or even 1000 or more, miles.

As to the receiving medium on which the integral image is written, this can simply be the back side of the integral lens sheet (which in a conventional integral lens sheet is opposite shaped lens surfaces, such as the semi-cylindrical shaped lens surfaces of a lenticular lens sheet). Alternatively, the image receiving medium could be one or more layers coated on the back side, such as a photosensitive layer or layers (which may in particular be any known photographic layer or layers) or a thermal receiver layer, or a suitable substrate which is later attached to an integral lens sheet. Additionally, the image receiving medium on the back side, can be covered with a protective layer either before or after writing the image. In the case of such a protective layer covering before writing the image, the protective layer can be transparent so that writing can be done by a light beam illuminating photosensitive layers on the back side. It will also be appreciated that the methods of the present invention can be applied to integral images (and particularly lenticular images) which can exhibit a wide range of effects including motion, depth, flip (that is, apparently unrelated images), and other lenticular related effects.

In this application, by a perspective sequence of images is referenced a sequence of images (at least two) in an integral image which are views of a scene taken from different perspectives (that is, from different angular positions) and thereby provide a three-dimensional effect when viewed through the integral lens sheet. The resulting lenticular image may be referred to as a three-dimensional lenticular image. If at least three different perspectives images are used, this can include the ability to at least partially look around an object in the scene. A motion sequence is a sequence of images (such as two, three, four or more images) each image of which has at least one (or most, or all) scene element in common but which changes location, shape or size within the scene in a logical manner through the sequence. Motion image sequences for lenticular images are generally two-dimensional images but can be made from a perspective sequences.

By a two-dimensional image is referenced an image which, when aligned and viewed through an integral lens, does not have any viewable depth element (that is, it does not appear three-dimensional and the viewer cannot look around it at all). By a scene element in this regard, is referenced the same view of the same object (which includes the object appearing to be the same size).

Turning now to the drawings, a typical actual (or real) lenticular image element, as seen on FIG. 1, includes a lenticular image 11 containing sets 14 of interleaved lines related to specific lenticules and positioned for a specific viewing distance (only some sets 14 being shown in FIG. 1 for clarity), taken from individual images. Each set 14 contains a line from each image, in a manner well known in the lenticular imaging art. The lenticular image element also includes a lenticular lens sheet 12. Lens sheet 12 includes on a front side 12a, plural adjacent and parallel straight lenticules 13 with their typically convex lens surfaces. Interleaved image 11 is typically positioned adjacent a back side 12b of lens sheet 12 (although it could be spaced therefrom) with each set of lines 14 aligned with a corresponding lenticule 13. Such alignment does not necessarily require that all lines of a set 14 will be directly beneath a corresponding lenticule 13 (although they often will be), since in some cases such as described in U.S. Pat. Nos. 5,276,478 and 5,278,608, some of the lines of a set may in fact be beneath an adjacent lenticule. Hence, the alignment is an optical alignment with image sets being positioned depending upon the intended viewing distance from the lenticular image. Image 11 when aligned with lens sheet 12, are together sometimes referenced as a lenticular image element. When image 11 and lens sheet 12 are positioned as shown in FIG. 1, with the lenticules of sheet 12 parallel to the plane of a viewer's eyes (sometimes referenced as a user or observer). lens sheet 12 allows the observer to see only one of the images at a time. Note that if the lenticular image element of FIG. 1 is rotated 90 degrees from the horizontal position of FIG. 1 so that the lenticules are perpendicular to a viewer's eyes, two images can be seen at the same time, thus enabling viewing of a three-dimensional lenticular image in a known manner. With regard to FIG. 2 an observer 24 can see all the images by successively tilting the display through an angle to various different positions 21, 22, 23, each one corresponding viewing of one specific image. The images can be still images, depth images (which are properly observed with the lenticular image element oriented vertically), or motion sequences or any combination of these three. In the case of a motion sequence, the impression of movement is achieved by tilting the lenticular image through an angle and at such a speed that the sequence of images embedded in it appears to the observer at an appropriate frame rate. In FIG. 2, lenticules 13 are not visible since in practice they are typically of very small width (for example, less than 1 millimeter).

Figure 4:
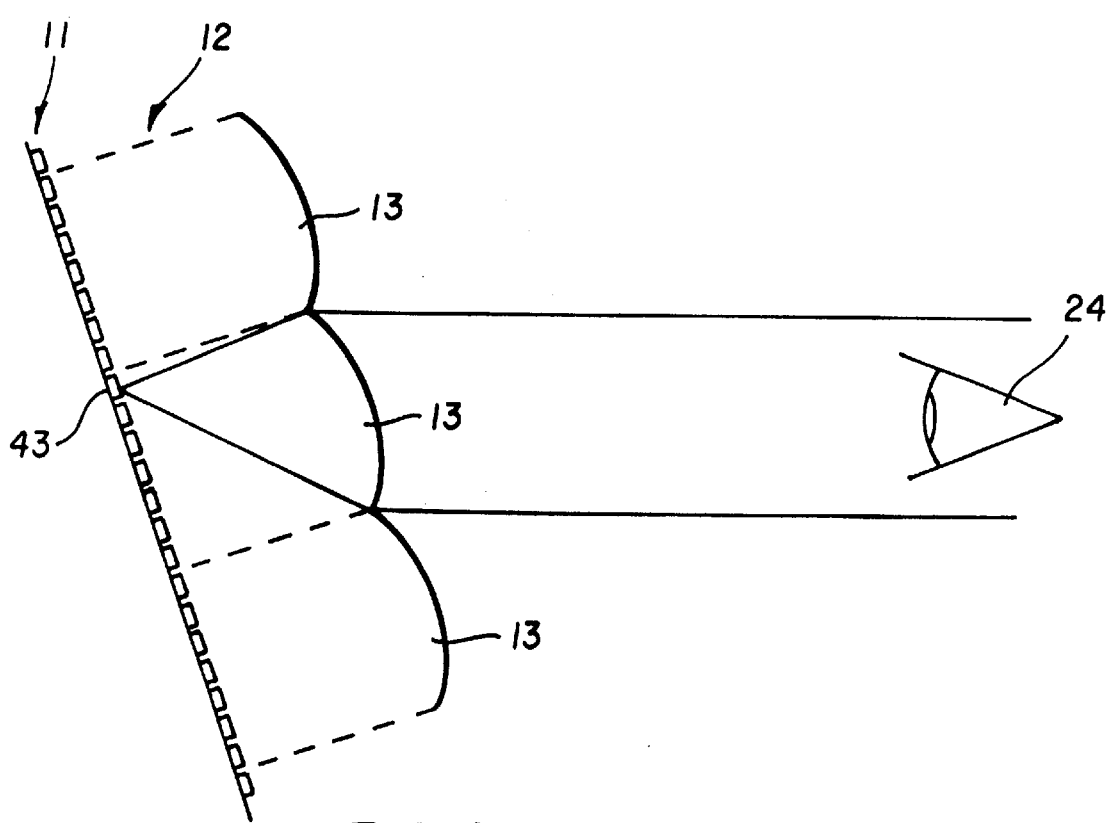
Figure 5:
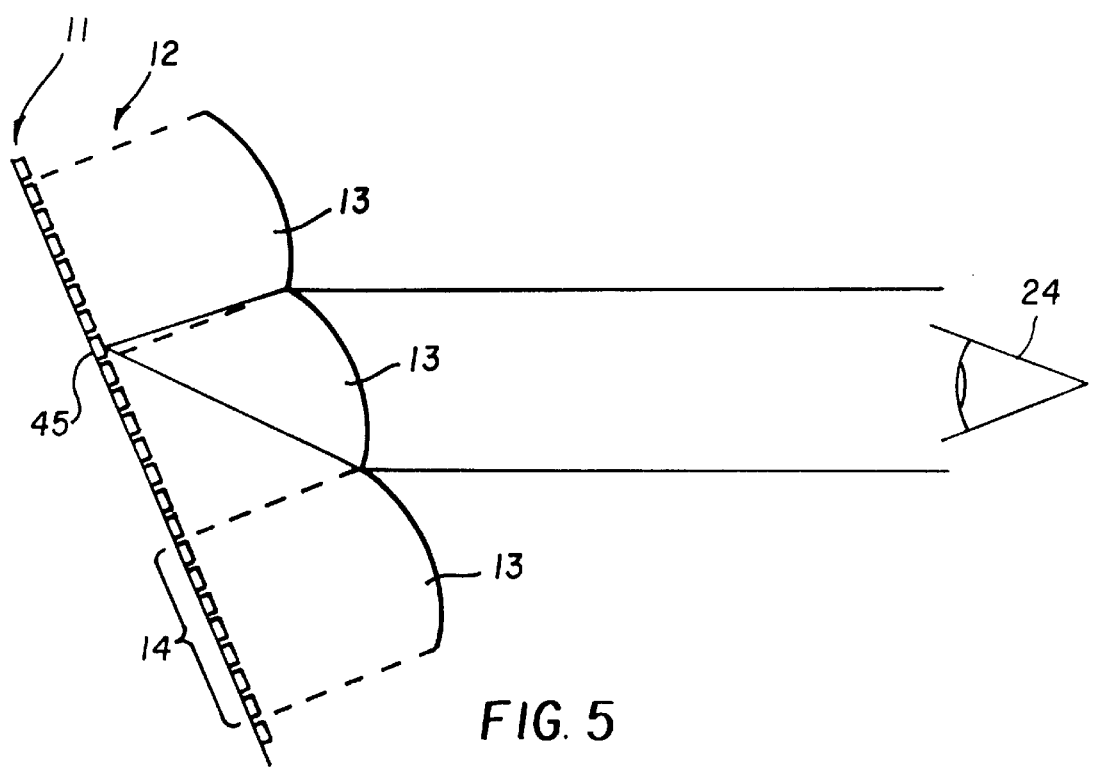

To form a lenticular image, the various images (that is, conventional images) from which a lenticular image is to be formed, are decomposed into strips or lines (which may be one or more pixels in width). These image strips or lines from the different images are interleaved and aligned behind a corresponding lenticule at its focal point, in a known manner. Such interleaving is, for example, described in U.S. Pat. No. 4,506,296, U.S. Pat No. 5,278,608, U.S. Pat No. 5,276,478, U.S. Pat. No. 5,455,689, and U.S. Pat No. 3,534,164. Thus, as seen on FIG. 3 when an observer 24 is looking through the lenticular array, he or she can see, at a sufficiently large viewing distance, the image line 42. By seeing simultaneously all the lenticules, one can see simultaneously all the image lines of one image and hence can see observe a complete corresponding image. As shown in FIG. 4, as the view angle of the observer 24 relative to the lenticular image is altered, an image line 43 from another image will be seen by the observer behind the lenticule array (and hence the observer sees a different image). Similarly, as the observer continues to increase their angle away from a line 90° to the lenticular plane about the axis of lenticules 13 (specifically, away from the plane normal to those axes), as shown in FIG. 5, an image line 45 from still another image will be observed (and hence the observer sees still another image). Because the width of each image line is much narrower than the width of the lenticule itself, many image lines can be behind the same lenticule (the number of different image lines corresponding to the number of images that can be seen). The image which is then seen by the observer depends on the view angle of the lenticular image. Thus, as mentioned above, tilting a lenticular image element through a range of angles allows observation of a sequence of motion images, in the case of a lenticular motion image.

Figure 6:
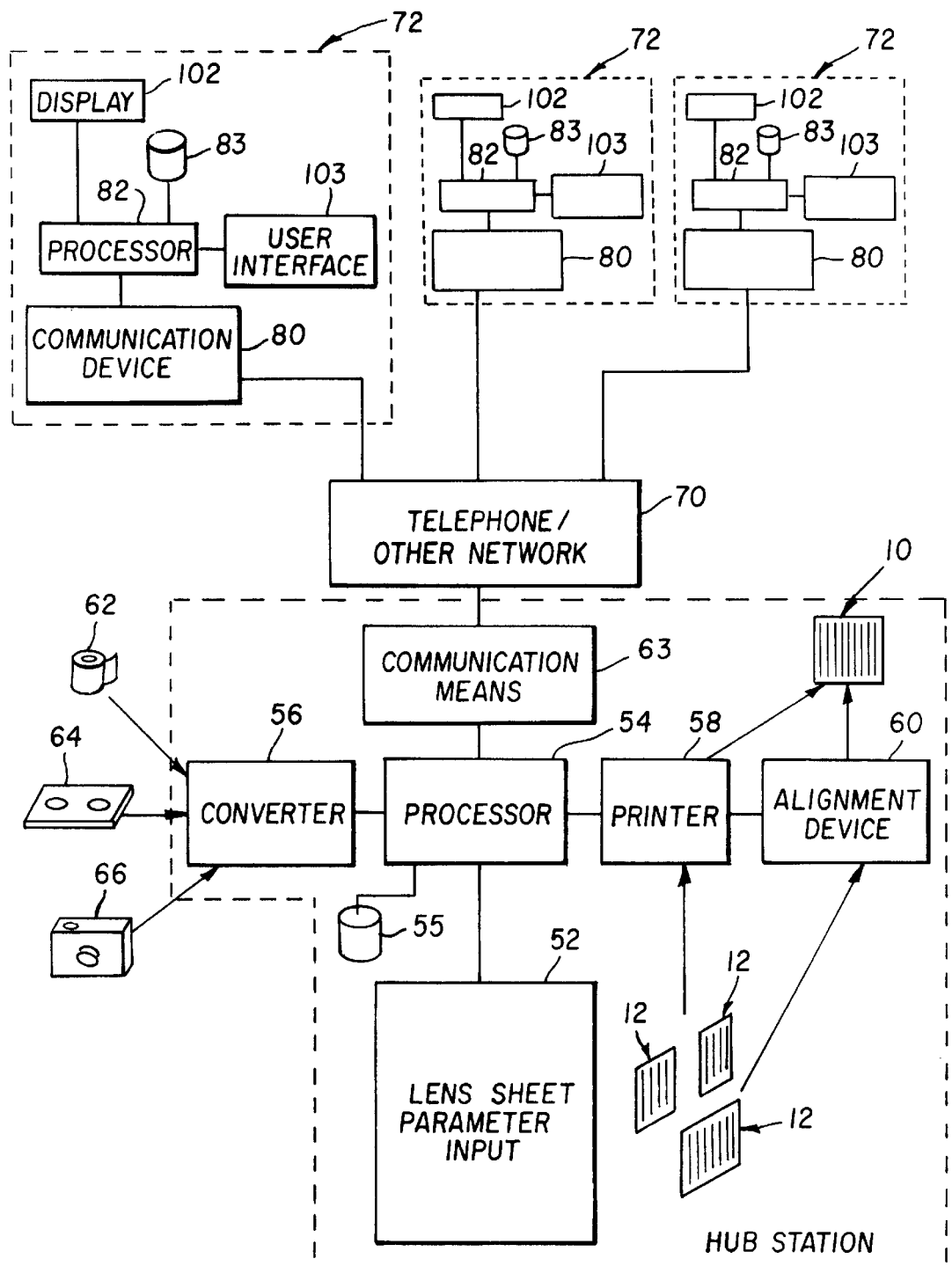
FIG. 6 is a block diagram illustrating an apparatus of the present invention.

Referring now to FIG. 6 in particular, an apparatus and method of the present invention will be described. In the apparatus of FIG. 6 a centralized hub station 50 can communicate with any one of remote terminals 72 through a network in the form of a standard telephone network 70. In the following discussion, it will be assumed that hub station 50 is communicating with a specific one of remote terminals 72 at which the consumer is located. However, simultaneous communication with other consumers at other of the remote terminals is, or course, possible.

Centralized hub station 50 receives from a customer, a physical media in the form of film 62 or videotape 64, carrying a plurality of images to be used for forming a corresponding actual lenticular image. Alternatively, hub station 50 can receive images as data such as from a digital camera 66 communicating with hub station 50. A converter 56 performs any necessary conversion of the images received to generate images in a digital format suitable for handling by a processor 54 of hub station 50, as well as by remote terminals 72. Such conversion may include chemical processing of film 62 where such film is undeveloped, or converting the analog images on a developed film 62 or on an analog videotape, to digital image signals.

Processor 54 receives the images from converter 56 (which images are now in the form of digital signals) and stores them in a memory 55. A number of alternative procedures may then take place. In one procedure, processor 54 communicates the individual images through a communications means 62 to one of the remote terminals 72 at which the customer is present (the customer previously having connected into centralized hub station 50), for storage in a memory 83. In addition, physical parameters of lenticular lens sheets 12, which are available at hub station 50, may also be transmitted to the remote terminal 72 through the network. Such physical parameters include information on lenticular pitch, lens sheet sizes, number of views or frames per lenticule, data from which can be determined the expected light distribution from observed images viewed through a lenticular lens sheet aligned with a desired actual lenticular image as the angle of viewing about the axis of the lenticules is altered, or other optical parameters of the lenticular lens sheets 12 available at hub station 50. A communication means 80 receives such signals and passes them along to processor 82.

Processor 82 can then allow the consumer, through user interface 103 (which may includes a keyboard, mouse, voice recognition means, and the like) to select which of the images received he would like to have incorporated into a lenticular image (such as a motion lenticular image or three-dimensional lenticular image). With this information and the received data on available lenticular lens sheet parameters, processor 82 can then form a simulated lenticular image using the images of the received series which were selected by the consumer. Various options for providing the simulated image to a display 102 are discussed in more detail below. When the consumer is satisfied with a simulated lenticular image appearing on display 102, they can then indicate their approval to produce the corresponding actual lenticular image, through interface 103 which is transmitted to hub station 50. The approval may take the form of transmitting the approved interleaved image itself, in which case processor 82 does the necessary interleaving of the images selected to form the lenticular image. To reduce the amount of data required to be transmitted though, the approval may just be an indication of the characteristics of the desired actual lenticular image, just as the number of images, an identification of the actual images selected, the pitch (that is, the width) of the image lines and their positioning relative to corresponding lenticules 13. In any either, the approval may further include an indication of the particular lenticular lens sheet (that is, the one with the desired parameters) with which the actual lenticular image is to be aligned.

The consumer may optionally wish to add to the viewed images of a simulated lenticular image, one or more images which they have already acquired in a suitable format at remote terminal 72. Such images can added to an interleaved lenticular image at remote terminal 72 if this is to be transmitted as the approval, or can be transmitted in their original form for subsequent interleaving at hub station 50 in the case where the transmitted approval from remote terminal 72 is only an indication of the actual lenticular image characteristics. The added images themselves can be any type of image, including images of the real world and/or computer generated images. For example, the added image may be interpolated from one or more images of the series originally obtained from film 62, videotape 64 or camera 66, and may be text or titles, template images, special effects (including fade effects between frames).

The approval is received by processor 54. If the approval is in the form of the actual lenticular image itself, the received lenticular image may be sent directly to a printer 58. If the approval is in the form of the actual lenticular image data (which inherently includes lenticular image characteristics), then processor 54 interleaves lines from the individual images stored in memory 55 in accordance with those characteristics, then sends the resulting desired actual lenticular image to printer 58. Transmitting only the lenticular image characteristics not only allows reduction in transmitted data volume (and hence time savings) but also allows the more computationally intensive interleaving process to be performed at the centralized hub station 50, which is likely to have higher data processing capabilities than any of remote terminals 72.

Printer 58 may be any suitable hght resolution printer, using an inkjet, thermal, electrophotographic or optical technology. Printer 58 (or other optical technology) may print the lenticular image on a suitable substrate which is then afterward either manually aligned with the lenticular lens sheet 12 having the parameters selected by the consumer (and which were used to generate the simulated lenticular image at remote terminal 72), or aligned using any suitable alignment apparatus 60 (such as described in U.S. Pat. No. 5,479,270. Alternatively, printer 58 can align the actual lenticular image with the lens sheet 12 during printing of the image by printing directly onto the back side of lens sheet 12 (that is, on the flat side opposite the side of the lenticules), including printing onto a suitable receiving medium, such as a photosensitive layer on the back side. For example, printer 58 could be a laser or other modulated light beam printer which prints the lenticular image, line by line, onto a photographic layer on the back side of lens sheet 12. In another alternative, the images can be printed on one side of a planar substrate, then the lenticules formed on the other side after printing of the image.

In modifications of the above procedure, the physical media such as a developed film 62, carrying the images or the images in electronic form, can alternatively first be received at remote terminal 72. In this case, remote terminal 72 may have to be provided with a converter 56 (e.g. optical scanner). In such case, data flow can be further reduced by eliminating the need for centralized hub station 50 to transmit the individual images to remote terminal 72, it being only necessary that remote terminal 72 transmit an approval in the form of a lenticular image. In a case where the individual images are previously available at both remote terminal and hub station 50, data flow can be further reduced by remote terminal transmitting only the characteristics of the desired actual lenticular image.

In another option, where hub station 50 has the original images stored in memory 55, a proposed actual lenticular image can be first formed by processor 54 of hub station 50 and transmitted to remote terminal 72 for approval.

In this case processor 82 of remote terminal 72 can form a simulated lenticular image based on the proposed actual lenticular image and received parameters of lens sheet 12. In a further alternative, a simulated lenticular image corresponding to an actual lenticular image is formed at hub station 50 by processor 54 and then transmitted to remote terminal 72 for viewing and approval. This alternative has the advantage that the typically higher data processing capacity of the centralized hub station 50 can be used for this computationally intensive process.

Particular interactions between hub station 50 and remote terminal 72 will now be discussed. It will be understood in the following description that the "image processor" or "creator" is at hub station 50, while the "customer" or "user" is at a remote terminal 72.

Figure 7:
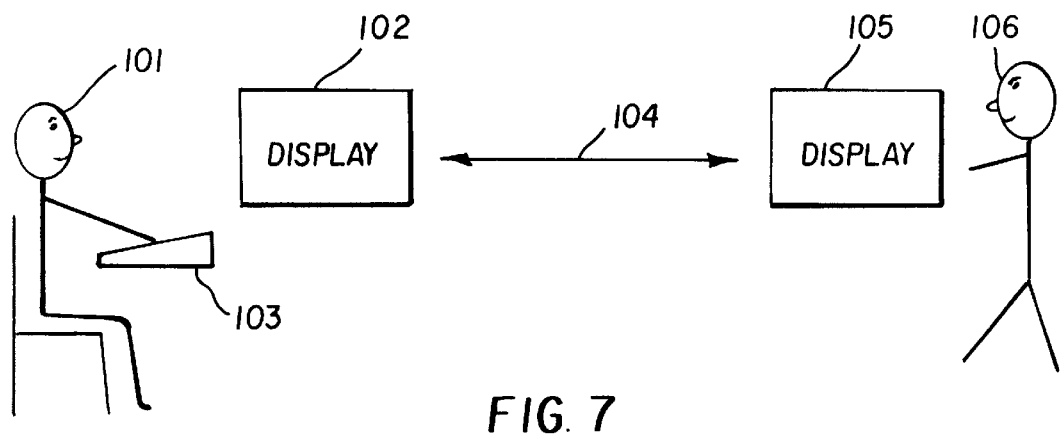
FIG. 7 illustrates operation of a portion of the apparatus in FIG. 6 in more detail.
Figure 8:
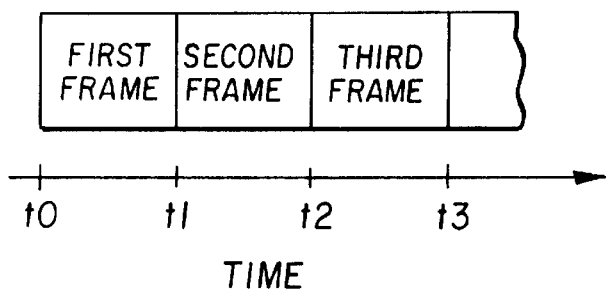
FIG. 8 illustrates display of a simulated lenticular image as a timed sequence of images in an actual lenticular image.

FIG. 7 shows an image processor or digital creator 101 a multiple image sequence viewed on display 102 by controlling key board 103. Once the work reaches a degree of completeness communication channel 104 sends the image sequence to customer 106 viewing display 105. The customer may see the directional image displayed using a number of techniques. For example the images may be viewed on the display as a time sequence as shown in FIG. 8 where between time t0 and t1 the first frame may be displayed between t1 and t2 the second frame may be displayed, between t2 and t3 the third frame may be displayed and so on to simulate the customer moving in front of the image.

Figure 9:
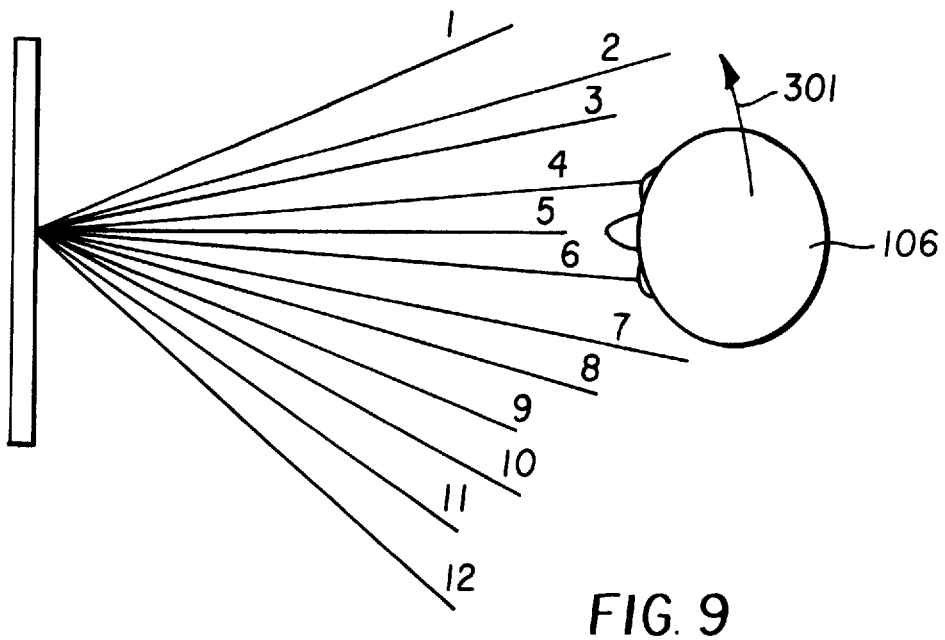
FIG. 9 is a view, from above, illustrating display of a simulated three-dimensional lenticular image.
Figure 10:
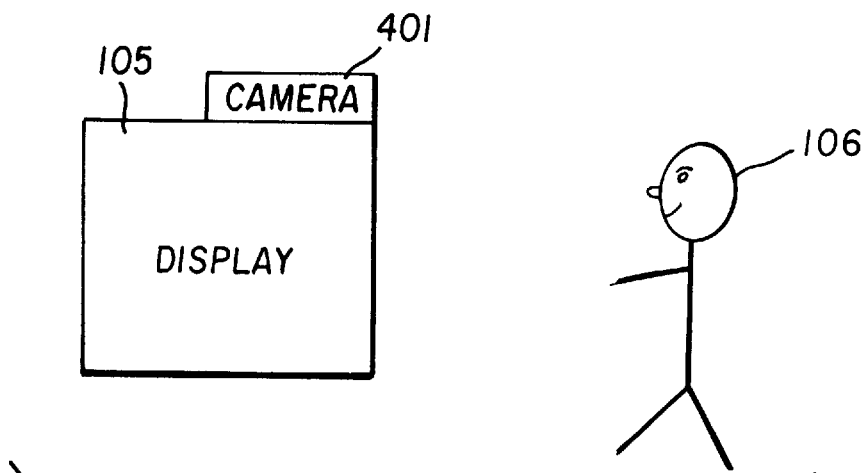
FIG. 10 is a side view illustrating further features for displaying a simulated three-dimensional lenticular image.

For a lenticular image that is meant to appear as a motion image the above display technique can be very realistic, however for an image which is meant to display three-dimensions (that is, a perspective lenticular image) it may be desirable for the customer to use synchronized glasses so that the left eye and right eye show different frames. In this case as shown in FIG. 9 the customer 106 may see frames 4 and 6. Frame 4 would appear in the right eye and frame 6 would appear in the left eye and then to simulate him moving in direction 301 in front of the image frame 3 would appear in the right eye and frame 5 in the left eye and then 2 and 4 and 1 and 3 respectively. However if the customer wished to simulate being further back from the image then frames 5 and 6 would appear, frame 5 in the right eye and frame 6 in the left eye. Alternatively by moving closer frames 3 and 7 may appear. frame 3 in the right eye and frame 7 in the right eye. To make the appearance more realistic a camera 401 as shown in FIG. 10 may be mounted on top of display 105 and the camera may be used to track the position of the customer so that as he moves in front of the image the appropriate image appears in the left and right eye.

Figure 11:
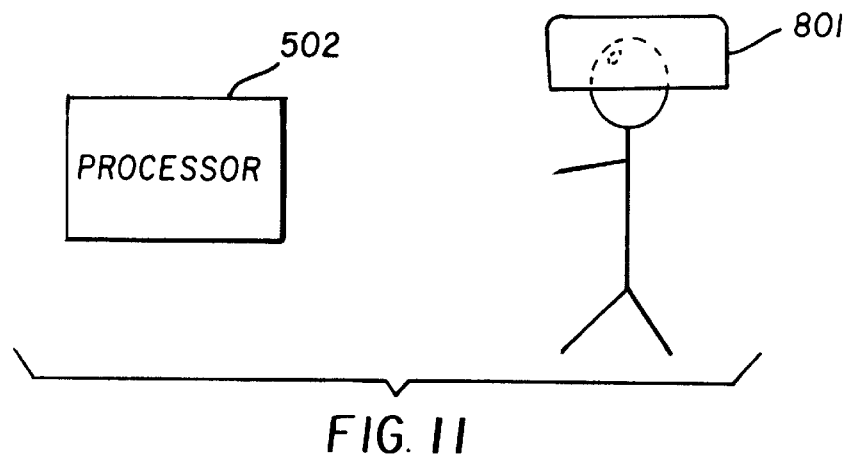
FIG. 11 illustrates an alternative arrangement for displaying a simulated three-dimensional lenticular image.

Another alternative is shown in FIG. 11. In the display of a simulated three-dimensional lenticular image as shown in this figure, the customer uses virtual reality headgear and has separate display units in left eye and right eye. As the customer moves, their relative movement is determined by sensing helmet 501. The customer position is communicated from helmet 501 to processor 502. With this position information, processor may provide the correct views to the customer's right and left eyes, as a function of his position. The "correct" views are those the customer would see at the same position relative to a corresponding actual lenticular image element. Also it will be appreciated that to sweep through the view sequence the customer may control a knob, joystick or mouse to adjust either the speed of sequence or such that the knob, joystick or mouse position controls the views that he sees at any given time, for example moving the mouse may simulate the customer's position so that the mouse position corresponds to the final intended viewing position.

Figure 12:
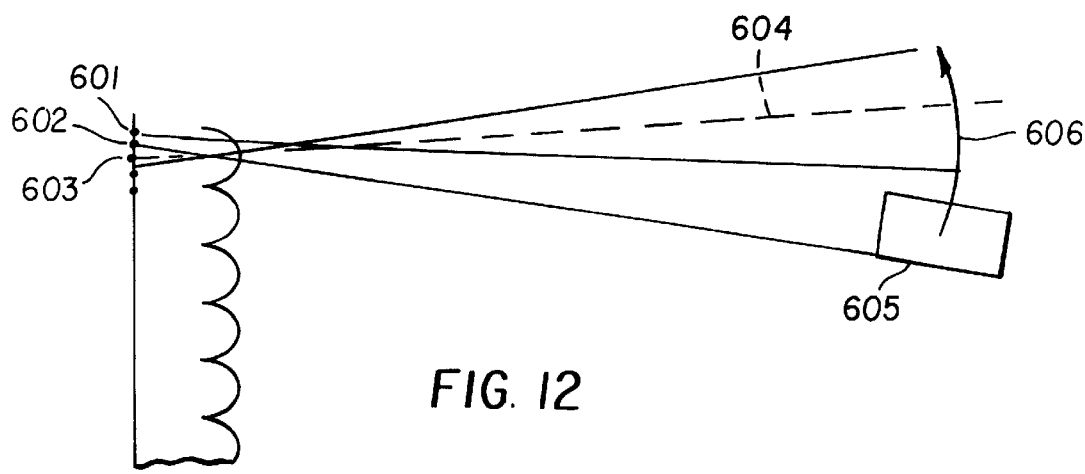
FIG. 12 illustrates an apparatus for determining a lenticular lens sheet light intensity distribution, for use in forming a simulated lenticular image, across a series of observed images as a viewer's angle relative to an actual lenticular image is altered.
Figure 13:
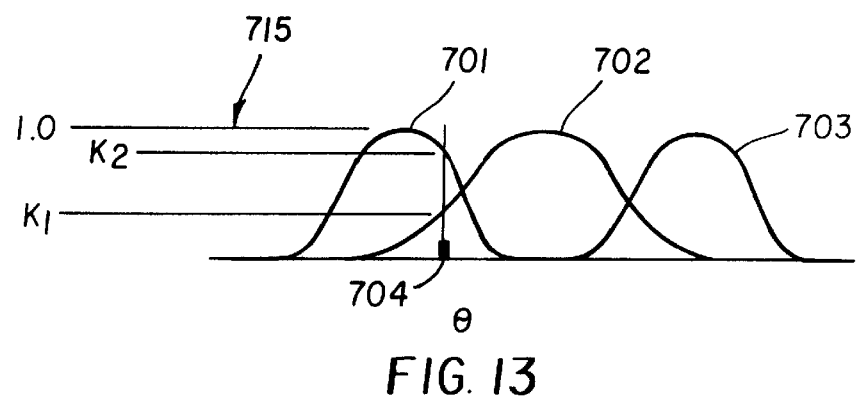
FIG. 13 illustrates a typical distribution as measured in the apparatus of FIG. 12.

To make the proofing more realistic it may be desired to incorporate for example the lenticular barrier or other directional effects into the image. For example by putting a test image on lenticular material and viewing it with a scanning sensor such that frames 601, 602 and 603 correspond to different colors. As the sensor 605 is moved across along path 606 in front of the lenticular material a color analysis by the sensor will indicate the portion of each image being viewed. These image intensity profiles can be thought of as shown in FIG. 13 when plotted against theta across in front of the lenticular material as the profiles 701, 702 and 703 corresponding to image frames 601 602 and 603 respectively. It is therefore possible to merge a frame sequence such that for example at location 704 corresponding to being mid-way between views 601 and 602 and shown as dotted line 604 in FIG. 12 to combine both images giving them the weights of the profile shown. For example at the specific location 704 the intensity is k1 times the video amplitude of the 602 image plus k2 times the amplitude of the 601 image where the maximum image profile value shown by level 715 is 1.0.

Figure 14:
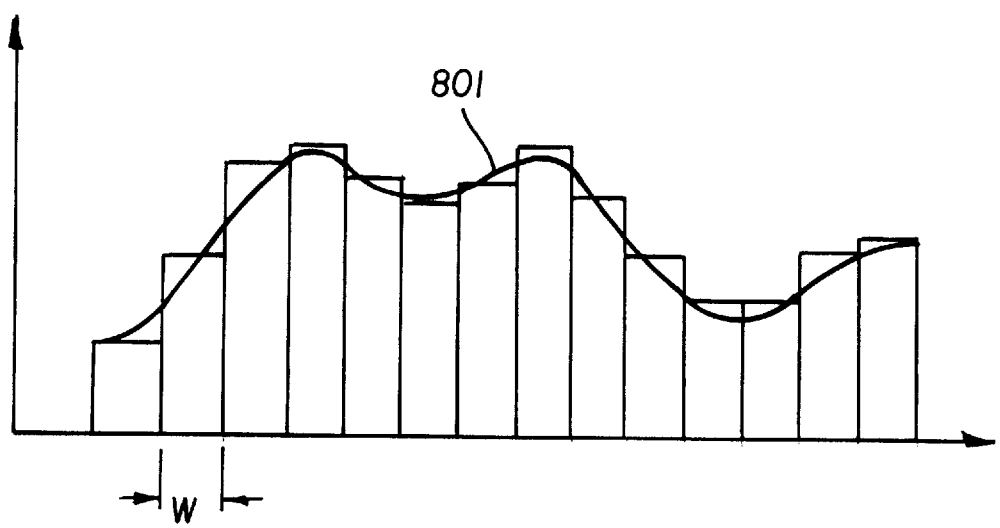
FIG. 14 illustrates a typical light distribution across individual lenticules of a lenticular image, for use in forming a simulated lenticular image.

Another way to enhance the realism of the proofing is to modify the displayed images to compensate for the size of the lenticules. This is possible because when viewing a lenticular image from any direction each lenticule would generally appear as a band of uniform color across its width so that the finest detail which can be seen across the width of a lenticular would generally correspond to one lenticules width. As a result it is possible to simulate this resolution limitation imposed by the lenticules on the final image by computing the video intensity such as shown in FIG. 14 where 801 is image intensity in a specific direction across the image, this direction being at right angles to the lenticules. Given that lenticular width is defined as shown, the image is broken into components of uniform color and intensity in the direction across the width, where each component is of width "w". Thus, a displayed image is formed in which the area that a lenticule covers of a specific view is rendered unform in the direction at right angles to the lenticule. It will be appreciated that it is also possible to add other characteristics to the displayed image to enhance the realism of viewing a simulated lenticular image.

Another enhancement of realism is to provide accurate color display with respect to the lenticular image being simulated.

Images may be preprocessed for display in either workstation 102 or 104. Generally for rapid response the image sequence will be downloaded using JPEG format or other compression format and display sequences and calculations specific to the viewers' position may be performed subsequent to transmission. However if transmission bandwidth is sufficiently high all calculations may be performed prior to transmission.

Figure 15:
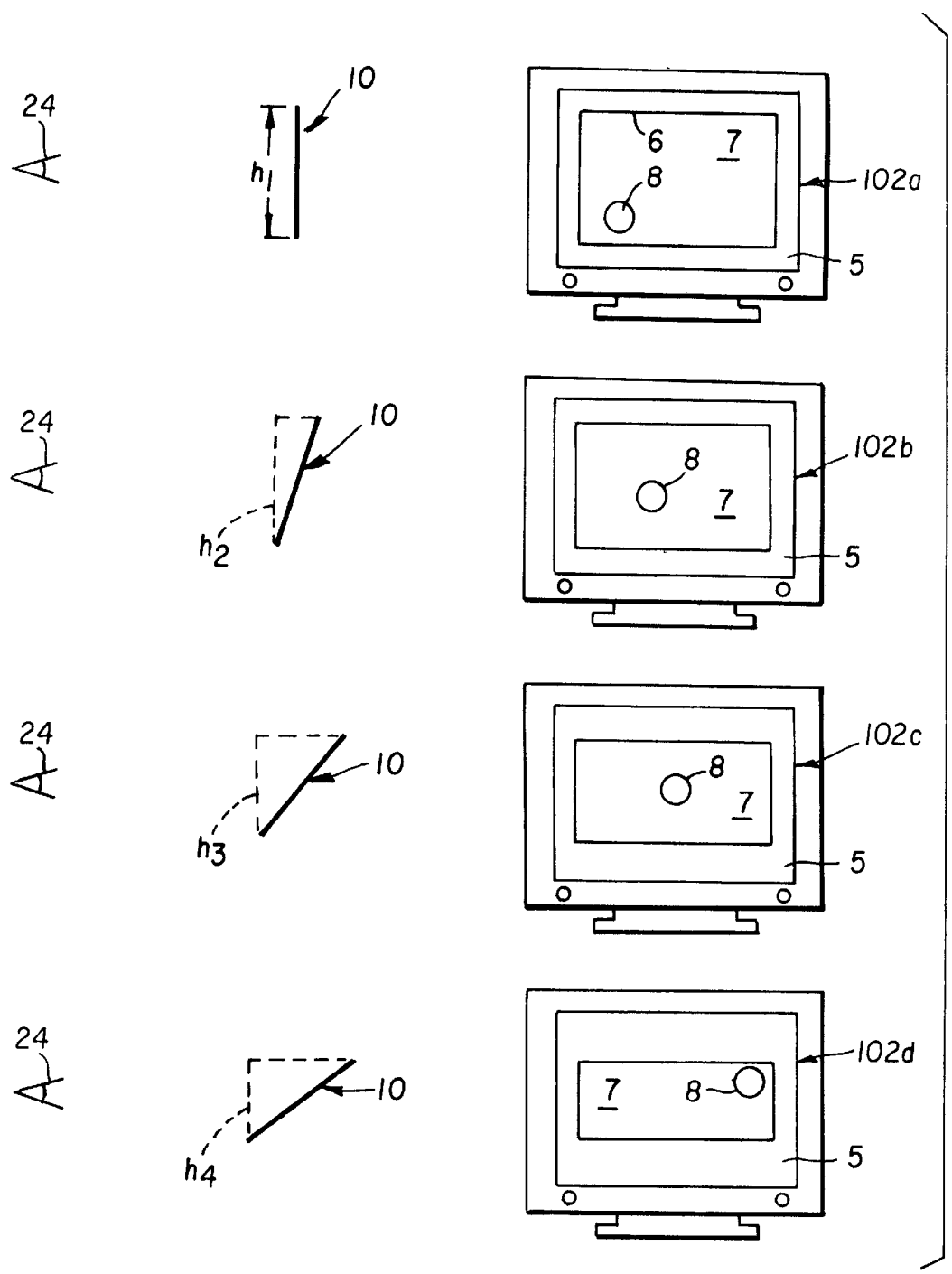
FIG. 15 illustrates a simulated motion lenticular image as a sequence of images observed on a display and corresponding motion of the corresponding actual lenticular image.

Referring now to FIG. 15 there is illustrated another aspect of a simulated lenticular image. FIG. 15 shows on the left hand side the tilting of an actual lenticular motion image so than observer 24 can view each of the images (that is, motion frames) thereon. On the right hand side is shown the same images as they may appear in a corresponding simulated lenticular image observed on a display 102. Each of the different images is shown in successive views of the display as 102a through 102d. Each view 102a to 102d of the simulated lenticular image corresponds to the image that would be expected to be seen on the actual lenticular image when it is in the angular position immediately to that view's left in FIG. 15. Ball 8 is an object in motion through the image sequence.

Note that in a desired lenticular image element 10 of FIG. 15, the apparent height h1 through h4 of the lenticular image is reduced while the viewer observes the motion image sequence. Thus, the height of an image area 7 appearing on display 102 is correspondingly reduced proceeding through views 102a to 102d (the image area having a border 6). Thus, the simulated lenticular image has a displayed image size variation through the image sequence 102a to 102d which corresponds with change in the angle between the corresponding actual lenticular image and a viewer while observing the sequence in the actual lenticular image. This further enhances the realism of the simulated lenticular image so that the viewer receives an actual lenticular image which appears very similar to what they expect to see based on the simulated lenticular image.

It will be appreciated that the various features discussed above to provide a realistic simulated lenticular image, can be combined for better realism. For example, the simulated lenticular image of FIG. 15 comprising a display of images of the actual lenticular motion image in sequence, may be provided with a luminance variation through the image sequence which corresponds with the expected light distribution, as discussed above in connection with FIGS. 12 through 14. Thus, luminance intensity could be altered as display 102 shows image frames between each pair of successive views 102a to 102d, the altered luminance profile being in accordance with FIG. 13.

While the above methods and apparatus have been discussed in connection with lenticular images in particular, it will be appreciated that they may equally be applied to integral images in general.

The invention has been described with reference to a preferred embodiment. However, it will be appreciated that variations and modifications can be effected by a person of ordinary skill in the art without departing from the scope of the invention.

PARTS LIST

| | |
|---|---|
| 1, 2, 3, 4, 5, 6, 7 | Image Frames |
| 7 | Image Area |
| 8 | Ball (Image Element) |
| 11 | Lenticular Image |
| 12 | Lens Sheet |
| 12a, 12b | Front Side, Back Side |
| 13 | Lenticules |
| 14 | Sets of Lines |
| 21, 22, 23 | Different Positions of Lenticular Image |
| 24 | Observer |
| 42, 43, 45 | Image Lines |
| 50 | Hub Station |
| 54 | Hub Station Processor |
| 55 | Memory |
| 56 | Converter |
| 58 | Printer |
| 60 | Alignment Apparatus |
| 62, 64 | Physical Media |
| 63 | Communication Means |
| 66 | Digital Camera |
| 70 | Network |
| 72 | Remote Terminals |
| 80 | Communication Means |
| 82 | Remote Terminal Processor |
| 83 | Memory |
| 101 | Digital Creator |
| 102 | Display |
| 102a to 102d | Views of Simulated Lenticular Image |
| 103 | User Interface |
| 104 | Communication Channel |
| 105 | Display |
| 106 | Customer |
| 301 | Direction of Movement |
| 401 | Camera |
| 501 | Sensing Helmet |
| 601, 602, 603 | Different Colored Frames |
| 604 | Line |
| 605 | Sensor |
| 606 | Path of Movement |
| 701, 702, 703 | Image Intensity Profiles |
| 704 | Location |
| 715 | Level |
| 801 | Image Intensity |

I claim:

1. A method for remote approval of lenticular images, comprising:
   a) at a centralized hub station, receiving a series of images;
   b) viewing, at a terminal remote from the centralized hub station, a simulated lenticular image using at least some images of the series displayed to simulate viewing an actual lenticular image formed from the images of the series;
   c) transmitting an approval from the remote terminal to the centralized hub station, for a plurality of the images of the series to be printed as the actual lenticular image;
   d) at the hub station, printing the actual lenticular image based on the approval.

2. A method according to claim 1 additionally comprising, at the hub station, interleaving the images of the series to form the actual lenticular image based on the approval.

3. A method according to claim 1 wherein the series of images is a sequence of frames from a motion sequence and the actual lenticular image is a motion lenticular image.

4. A method according to claim 1 wherein:
   the centralized hub station determines interleaved characteristics of a plurality of the images of the series and transmits the resulting interleaved characteristics to the remote terminal; and the remote terminal forms the simulated lenticular image using the received interleaved characteristics.

5. A method according to claim 4 additionally comprising, at the remote terminal, modifying the received interleaved characteristics and transmitting the modifications to the hub station.

6. A method according to claim 1 wherein the simulated lenticular image is based on a physical parameter of a lenticular lens sheet, the method additionally comprising, at the hub station, aligning the printed actual lenticular image with a lenticular lens sheet having the physical parameter.

7. A method according to claim 1 wherein the physical parameter is selected from lenticular pitch of the lens sheet and an optical parameter of the lenticules.

8. A method according to claim 6 wherein the physical parameter is the expected light distribution from observed images viewed through a lenticular lens sheet aligned with the actual lenticular image, as the angle of viewing about the axis of the lenticules is altered.

9. A method according to claim 8 wherein the actual lenticular image is a motion lenticular image and wherein the simulated lenticular image comprises a display of images of the actual lenticular motion image in sequence with a luminance variation through the image sequence which corresponds with the expected light distribution.

10. A method according to claim 1 wherein the actual lenticular image is a motion lenticular image, and wherein the simulated lenticular image comprises a display of images of the actual lenticular motion image in sequence, with a displayed image size variation through the image sequence which corresponds with change in the angle between the actual lenticular image and a viewer while observing the sequence in the actual lenticular image.

11. A method according to claim 1 wherein the actual lenticular image printed at the hub station has at least one characteristic which is the same as that used for the simulated lenticular image, the at least one characteristic being selected from the number of images used for forming the lenticular image, the line widths of lines segments used from each image to form the lenticular image, the width of each set of interleaved image lines corresponding to a lenticule, and the positioning of each set of interleaved image lines corresponding to a lenticule.

12. A method according to claim 1 additionally comprising, at the remote terminal, adding to the viewed series of images at least one additional image which is not one of the series of images at the centralized hub and transmitting that additional image along with or as part of the approval.

13. A method according to claim 1 wherein the approval transmitted from the remote terminal comprises instructions on interleaving images of the series.

14. A method according to claim 1 additionally comprising, at the remote terminal, adding to the viewed series of images at least one additional image interpolated from one or more images of the series, and transmitting that additional interpolated image or interpolated image reconstruction instructions, with or as part of the approval.

15. A method according to claim 1, additionally comprising receiving, at the hub, a physical media from which the series of images are obtained.

16. A method for remote approval of lenticular images between a centralized hub station and a terminal remote from the hub, comprising:

a) viewing, at the remote terminal, a simulated lenticular image using a series of images displayed to simulate viewing an actual lenticular image formed from images of the series, which simulated image is based on at least one physical parameter of a lenticular lens sheet;

b) transmitting the at least one lens sheet parameter between the hub station and remote terminal;

c) transmitting an approval of the actual lenticular image from the remote terminal to the hub station; and d) at the hub station, printing the actual lenticular image and aligning it with a lenticular lens sheet having the at least one lens sheet parameter.

17. A method according to claim 16 wherein the hub station has lenticular lens sheets of different parameters, and wherein the at least one lens sheet parameter is a parameter of one of those lens sheets which is transmitted from the hub station to the remote terminal.

18. A method according to claim 16 additionally comprising interleaving the lenticular image at the centralized hub station.

19. An apparatus for printing lenticular images with remote approval, comprising:

a) a centralized hub station having:
a first communication means for allowing the centralized hub station to communicate with a terminal remote from the hub station;
a printer to print a lenticular image based on an approval communicated from a remote hub station;

b) a terminal remote from the hub station having:
a display means for viewing a simulated lenticular image which uses a plurality of images displayed to simulate viewing an actual lenticular image formed from images of a series;
second communication means for communicating with the centralized hub station, including transmitting an approval for a plurality of the image series to be printed as a lenticular image.

20. An apparatus according to claim 19 wherein the centralized hub station further has:
a memory to store the images of the series;
a processor means for interleaving images of the series in accordance with the approval received from the remote terminal.

21. An apparatus according to claim 19 wherein the remote terminal additionally has a memory to store the images of the series, and wherein the remote terminal display means includes a processor means for forming the simulated lenticular image from the series of images.

22. An apparatus according to claim 19 wherein the remote terminal processor means can interleave images of the series to form the actual lenticular image, and wherein the second communication means transmits the lenticular image formed at the remote terminal as the approval from the remote terminal to the centralized hub station.

23. An apparatus according to claim 19 wherein the remote terminal processor means forms the simulated lenticular image from the images of the series based on at least one physical parameter of a lenticular lens sheet with which the actual lenticular image is to be aligned.

24. An apparatus according to claim 19 wherein the centralized hub station additionally has a processor means which can form the simulated lenticular image, and wherein the first communication means transmits the simulated lenticular image from the hub station to the remote terminal.

* * * * *